(No Model.)

A. S. SHERMAN.
CHICKEN FEEDER.

No. 342,546. Patented May 25, 1886.

WITNESSES:
Chas. S. Gooding.
Anton M. Lyman.

INVENTOR:
Algernon S. Sherman
by Chas. F. Perkins
his attorney.

UNITED STATES PATENT OFFICE.

ALGERNON S. SHERMAN, OF PLYMPTON, MASSACHUSETTS.

CHICKEN-FEEDER.

SPECIFICATION forming part of Letters Patent No. 342,546, dated May 25, 1886.

Application filed April 15, 1885. Serial No. 162,380. (No model.)

*To all whom it may concern:*

Be it known that I, ALGERNON S. SHERMAN, a citizen of the United States, residing at Plympton, in the county of Plymouth and State of Massachusetts, have invented certain new and useful Improvements in Chicken-Feeders; and I do hereby declare that the following is a full, clear, and exact description of the invention, which will enable others skilled in the art to which it appertains to make and use the same.

My invention consists of an improved feeder for chickens and young poultry of all kinds.

By the use of my invention the food may be supplied to the feeder but once a day, which obviates the frequent feeding that is considered necessary for young poultry. It prevents the large fowl from getting at the food and separates the young from them while eating. It keeps the food clean, prevents any waste, and shelters it in stormy weather.

Figure 1:
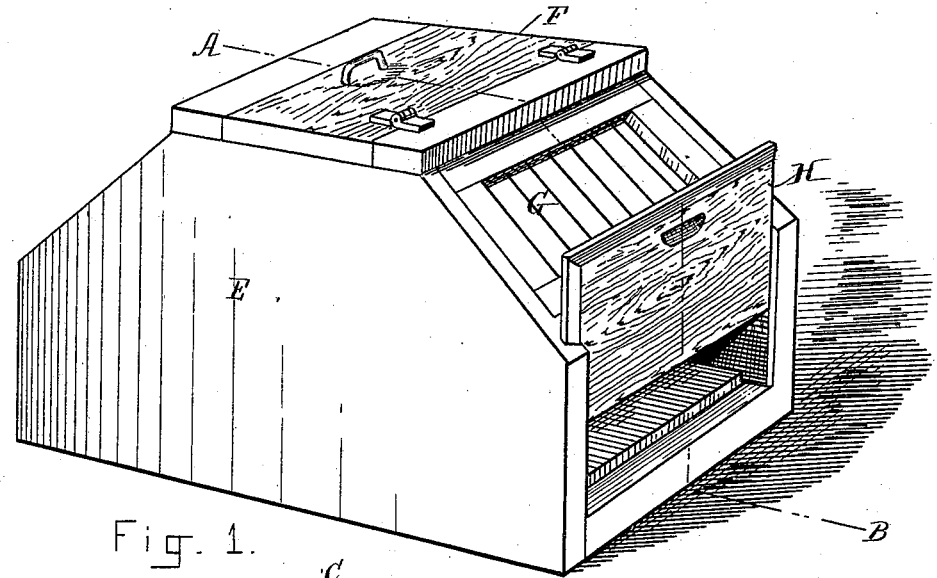
Figure 2:
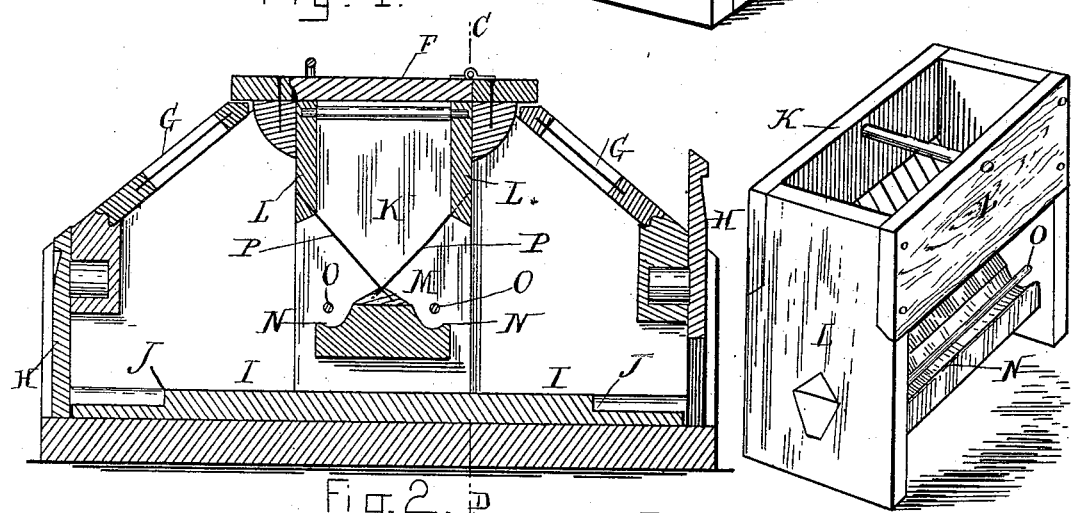
Figure 4:
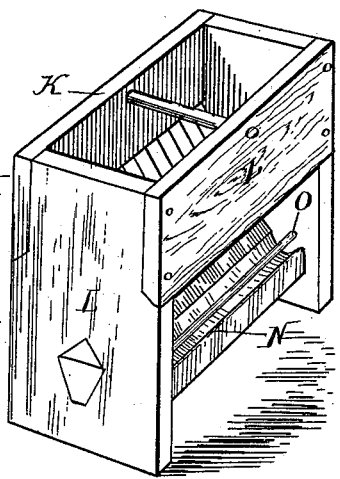
Figure 3:
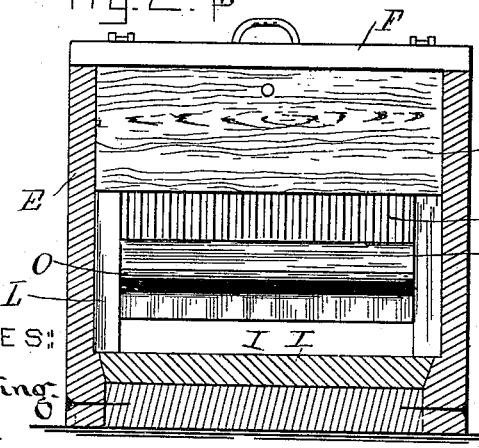

Figure 1 is a perspective view of my invention; Fig. 2, a sectional view through the line A B, Fig. 1; Fig. 3, a sectional view through the line C D, Fig. 2, and Fig. 4 a perspective view of the rack and trough.

E represents a box, having a cover, F, attached by hinges. On each side of the cover F the box has a slanting or sloping top, in which are placed the ventilators G G, which consist of wooden frames having a wire grating or netting. It is desirable to have thorough ventilation in the box to keep the food cool and prevent fermentation. The ends of the box are provided with doors H H, which slide up and down in grooves, and are fitted closely to the grooves, so that when the doors are raised the friction will sustain them in any position they are left. These doors may be raised a sufficient distance to permit the chickens to pass in and out, but not enough to admit larger fowl. There is a double floor or bottom to the box, the upper one, I, having angles J J thereon near the doors H H for the purpose of opposing the entrance of the head of a large fowl. A fowl can reach its neck a great distance in a straight line, but cannot readily turn it at an angle. The upper floor, I, slides lengthwise, and may be removed for the purpose of cleaning the filth from the box.

K is a rack, open at the top, which is constructed of a wooden frame, L. This frame fits closely between the sides of the box and rests upon the bottom, and may be taken out through the door F in the top, which covers a hole just large enough to admit the free passage of the frame L in or out. The bottom of the rack is at comfortable reaching distance from the chickens when standing on the floor. The rack is made in the form of a hopper. Each side is made of wires P, which are parallel to each other and sufficiently near to prevent the food falling out between them to any considerable extent, and still to admit the chicken's bill between them. The upper ends of the wires enter the upper bars of the frame L, and the bottom ends enter the wooden bar M upon a straight line, and at a point halfway between the two consecutive wires on the opposite side. The object of this arrangement is to prevent any accumulation of food between the opposite wires.

N N are troughs on each side of the rack and beneath it for the purpose of catching any of the food which may drop from the manger or rack K. The troughs are narrow, and have the bars O O immediately over each to prevent the chickens from getting their feet into the troughs. There is sufficient space between the bar and the trough for the chickens to insert their bills and eat the food which has fallen into the trough.

I find from actual experience that the chickens will eat up clean everything in the rack and troughs, and that they are unable to get their feet into the troughs and track the dirt into them.

What I claim as my invention is—

A chicken-feeder consisting of the box E, suitably ventilated, having a door, H, capable of sliding up and down, and the floor I, having the angle J, in combination with the hopper K, having its sides composed of straight wires P, converging at their lower ends, troughs N beneath said wires, and bars O over each trough, substantially as described.

ALGERNON S. SHERMAN.

Witnesses:
CHARLES C. BARTON,
CHAS. F. PERKINS.